Patented May 13, 1930

1,758,792

UNITED STATES PATENT OFFICE

WINFRID HENTRICH AND MAX HARDTMANN, OF WIESDORF-ON-THE-RHINE, GERMANY, ASSIGNORS TO GENERAL ANILINE WORKS, INC., OF NEW YORK, N. Y., A CORPORATION OF DELAWARE

CONDENSATION PRODUCT OF THE BENZODIAZINE SERIES

No Drawing. Application filed December 14, 1927, Serial No. 240,074, and in Germany December 13, 1926.

The present invention relates to new condensation products of the benzo-diazine series of the general formula:

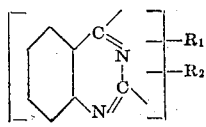

in which $R_1$ represents any substituent which is attached to the benzo-diazine residue with a nitrogen, sulfur or oxygen atom, i. e., —$NH_2$, substituted —$NH_2$ groups, —OH, —OR, (R=alkyl, aralkyl or aryl), —SH, SR, (R=alkyl, aralkyl or aryl) or —$SO_2R$, (R=OH, alkyl, aralkyl or aryl), and $R_2$ represents a substituted amino group, a substituted mercapto group or a substituted hydroxy group with the exception of an alkoxy group.

In accordance with the present invention appropriate quantities of dihalogen-benzodiazines, in particular 2.4-dihalogen-quinazolines, are caused to react with one molecule of such compounds as possess one or more reactive hydrogen atoms attached to a nitrogen, sulfur or an oxygen atom, or with two similar molecules of these compounds, with the exception of water, ammonia, alkali-hydrosulfide and the monohydric aliphatic alcohols, in such a manner that, while splitting off hydrogen halogenide, the above indicated compounds are produced.

The new condensation products thus obtainable are greyish powders which are soluble in water with a generally yellowish coloration, if they contain an acid group, and insoluble in water, if they are free from an acid group. The products find the most varied application as such or after further decomposition, for example, as intermediate products in the manufacture of dyestuffs or also for the manufacture of pharmaceutical products.

The following examples will illustrate that part of our invention in accordance with which condensation products of similar constitution are obtained.

*Example 1.*—19.9 grams of 2.4-dichloroquinazoline (1/10 of a mol) are dissolved in 235 cc. of acetone and the solution is dropped at 65° C. with efficient stirring into a solution of 68.2 grams of 1-amino-8-hydroxy-naphthalene-3.6-disulfonic acid (2/10 mol of the acid sodium salt) and 33 grams of crystallized sodium acetate in 600 cc. of water. The whole is maintained for about 2 hours at 70° C. after which the temperature is increased to 100° C., whereby the acetone is distilled off, and the temperature is now maintained until the 1-amino-8-hydroxy-3.6-disulfonic acid has almost completely disappeared. On salting out, the sodium salt of the condensation product having the probable formula:

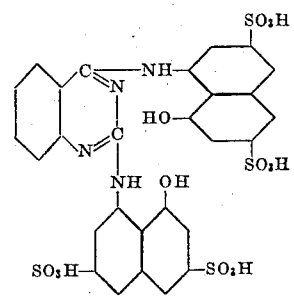

is obtained as a yellowish grey, slimy precipitate, which, after filtering and drying, forms a grey powder easily soluble in water with a faint yellowish coloration. The new compound no longer reacts with nitrous acid, exhibits no fluorescence in alkaline solution and couples with two molecules of diazo-compounds.

The condensation products from two molecules of other aminohydroxynaphthalene-sulfonic acids, such as for example, 2-amino-5-hydroxynaphthalene-7-sulfonic acid, 2-amino-8-hydroxynaphthalene-6-sulfonic acid, 1-amino-8-hydroxy-naphthalene-4-sulfonic acid and the like and one molecule of a 2:4-dihalogenquinazoline can be produced in an exactly similar manner. Likewise derivatives of aminohydroxynaphthalene-sulfonic acids such as the corresponding N-monoalkylated compounds or the N-(aminobenzoyl) compounds, such as for example, 3'-aminobenzoyl-2-amino-5-hydroxynaphthalene-7-sulfonic acid can also be linked up by means of 2.4-dihalogen-quinazolines in accordance with the directions of the example.

*Example 2.*—19.9 grams of most finely powdered 2:4-dichloro-quinazoline are suspended in 100 grams of water. A solution of 24 grams of the sodium salt of 4-nitro-1-aminobenzene-3-sulfonic acid is then added and the whole is heated with efficient stirring to 45° C. until all 4-nitro-1-aminobenzene-3-sulfonic acid has entered into reaction. The solution, which is acid to litmus, now contains the condensation product from one molecule of 2.4-dichloro-quinazoline and one molecule of 4-nitro-1-aminobenzene-3-sulfonic acid, possessing still one available chlorine atom. The said condensation product can be isolated by salting out in the form of a yellowish powder. At this point another aqueous solution of neutral reaction of 24 grams of the sodium salt of 4-nitro-1-aminobenzene-3-sulfonic acid is heated to 70–85° C. and the above solution of the intermediate product, containing chlorine is caused to run in slowly, while stirring very vigorously, maintaining the temperature at 85° C., when the whole solution has been added. After cooling, the solution is rendered acid to Congo and the new product is obtained by salting out. This condensation product from one molecule of 2-4-dichloro-quinazoline and two molecules of 4-nitro-1-amino-benzene-3-sulfonic acid forms a faintly reddish powder, which dissolves in water with a yellow coloration and no longer reacts with nitrous acid. It is presumed to possess the formula:

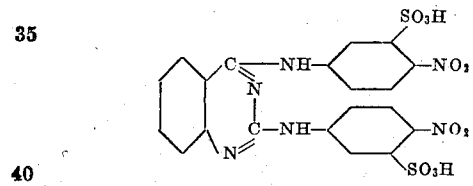

and can be easily reduced, (for example with iron and acetic acid) to the corresponding diamino compound. This diamino compound can also be produced directly by following the conditions stated above when condensing one molecule of 2.4-dichloroquinazoline with two molecules of 1.4-phenylene-diamino-3-sulfonic acid. An isomeric compound of the formula:

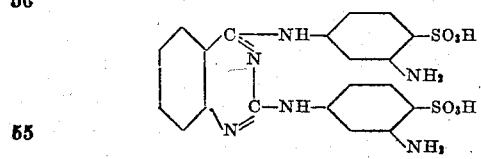

can be produced by replacing the 1.4-phenylenediamine-3-sulfonic acid by the 1.3-phenylenediamine-4-sulfonic acid; the new products are capable of being tetrazotized. They represent grey powders which are soluble in hot water, from which they can be salted out.

In an entirely similar manner two molecules of any desired aromatic amino-compounds or also aminoazo-compounds can be linked up by means of one molecule of 2.4-dihalogen-quinazoline.

*Example 3.*—19.9 grams (1/10 of a mol) of most finely powdered and sieved 2.4-dichloroquinazoline are slowly added at 60° C. with efficient stirring to a solution of 44.6 grams (2/10 of a mol) of the acid sodium salt of 5-sulfinic-2-hydroxybenzoic acid in a little water. When the addition is completed, the whole is heated to 100° C. and maintained at this temperature with continual stirring until the salicyl-sulfinic acid can no longer be detected. By working up in the customary manner, a product of the probable formula:

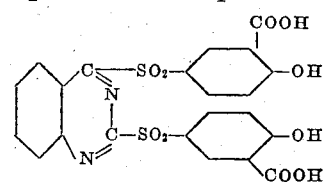

is obtained as a colorless crystalline powder, which is easily soluble in alkalis.

*Example 4.*—3060 grams of 5-amino-2-hydroxybenzoic acid (100%) are suspended in 56 000 cc. of water, the solution being maintained weakly acid to litmus by means of sodium carbonate, when the whole enters into solution. After heating to 45° C. and stirring well, 1990 grams of 2.4-dichloroquinazoline (finely powdered) are introduced and 50 cc. of acetone are added. The condensation soon commences. After prolonged heating at 50° C., the temperature is raised to 85° C. When a test portion no longer reacts with nitrous acid, the solution is salted out and the precipitate is filtered and washed with a little water. The new condensation product presumably possess the following formula:

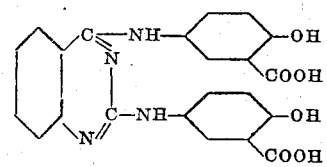

It represents a greenish-grey powder, which dissolves with difficulty in cold water, but more easily in hot water. The addition of a little caustic soda solution readily causes solution. From this alkaline solution mineral acids precipitate the free acid in the form of a slimy precipitate.

*Example 5.*—4.46 grams (2/100 of a mol) of 1-amino-anthraquinone are dissolved in 40 grams of nitro-benzene and a solution of 2 grams of 2.4-dichloro-quinazoline (1/100 of a molecule) in 10 grams of nitrobenzene is added thereto. The whole is now heated in a nitrobenzene bath until the temperature reaches 185° C. (inside); this temperature is maintained until the bulk of the hydrochloric acid has been split off, after which a short heating to 200° C. takes place, until the 1-amino-anthraquinone can no longer be detected. After cooling, fine red crystals separate out, which (after recrystallization from nitrobenzene) do not melt even at 265° C.; they consist of the compound of the probable formula:

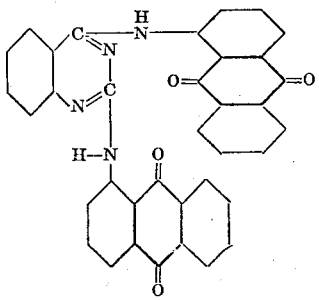

In a similar manner two molecules of 2-aminoanthraquinone can be linked up by means of one molecule of 2.4-dihalogen-quinazoline or any other desired amino- or amino-hydroxy-anthraquinones may be employed in accordance with the same reaction, such as for example 1-amino-4- (or 5-) benzoylamino-anthraquinone and the like.

*Example 6.*—4 grams (2/100 of a mol) of 2.4-dichloroquinazoline are dissolved in 10 cc. of dry toluene; then 3.8 grams (4/100 of a mol) of aniline are dissolved in 20 cc. of toluene, 3.6 grams of anhydrous sodium acetate are added, the solutions are poured together and heated with stirring to 95° C. When all the aniline has disappeared, the whole is allowed to cool, whereby the greater part of the condensation product separates in colorless crystalline crusts. After filtration the crystalline mass is dissolved in glacial acetic acid and after filtration water is added to the solution until the same becomes cloudy. The new compound is obtained as a snow white powder (in the form of an accumulation of fine needles) free from halogen and thus differing essentially from the compound described by Kötz (Journal für praktische Chemie, page 303, vol. 47 new series). This compound has the probable formula:

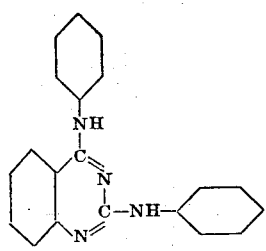

In quite an analogous manner two molecules of any other desired amine of the benzene or naphthalene series can be condensed with one molecule of a 2.4-dihalogenquinazoline; thus, for example, the homologues and substitution products of aniline, such as the toluidines, the halogen or nitro-anilines or also the acyl-aminoanilines and the like can be employed; likewise the corresponding bases of the naphthalene series, such as naphthylamines, chloro- or nitro-naphthyl-amines or the like or also aliphatic amines, such as for example

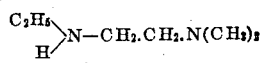

*Example 7.*—24 grams of sodium phenolate are added to 50 grams of molten phenol; the temperature is raised to 130–140° C. and, while stirring 19.9 grams of 2.4-dichloroquinazoline are slowly added, which causes a further spontaneous rise in temperature. The dichloroquinazoline disappears quickly, and the temperature is maintained for some time at about 170° C., whereby the melt becomes thinner. After cooling, the mass is extracted with ether, the residue is filtered and stirred into cold water. Should it happen that the suspension first obtained still shows a weakly alkaline reaction, this is neutralized with a little acid. Then the mass is again filtered and crystallized from glacial acetic acid. Colorless thick rhombic shaped crystals are obtained, of the probable formula:

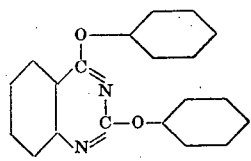

*Example 8.*—5 grams of thioparacresol and 1.7 grams of aqueous sodium acetate are melted together. At 70° C. 2 parts by weight of 2.4-dichloroquinazoline are added. The melt assumes a yellowish coloration and the temperature rises to about 115° C. This temperature is maintained for some time, and then after cooling, the mass is extracted with ether, filtered and the residue dissolved in 90% acetic acid. From the filtered solution there crystallize pure white needles represented by the probable formula:

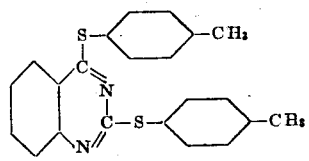

*Example 9.*—20 grams of 1-hydroxy naphthalene and 1.8 grams of sodium acetate are melted together at 105° C. and 10 grams of 2.4-dichloroquinazoline are added in small portions. At first no reaction takes place, but suddenly a violent rise of temperature becomes noticeable. Vigorous stirring is maintained and the temperature is finally raised to 130–140° C. and maintained for some time. After cooling, the viscous mass is extracted with ether, filtered and dissolved in nitrobenzene. From the filtered solution the 2.4-di (1'-naphthoxy)-quinazoline is precipitated as a weakly reddish powder, which under the microscope shows fine needles. The new compound is insoluble in water and, when the aqueous suspension is boiled with hydrochloric acid, a smell of 1-hydroxynaphthalene becomes noticeable.

*Example 10.*—34.8 grams of the sodium salt of 1.4-phenylenediamine-2-carboxylic acid are dissolved with the appropriate amount of hot water. The solution is cooled down to 45–50° C. and well stirred. Then 20 grams of the most finely powdered 2.4-dichloroquinazoline are added. The condensation soon begins and the reaction product becomes slimy. After adding a little crystallized sodium acetate the temperature is raised with continued stirring to about 85° C. At this temperature the last traces of the phenylenediamine carboxylic acid disappear. Common salt is then stirred in and, after cooling, acid is added until a perceptible reaction to Congo appears. The reaction product of the probable formula:

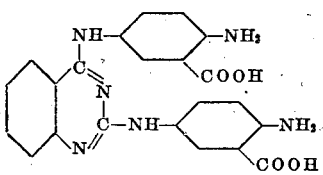

separates out. It is soluble with great difficulty in cold water, more readily soluble in hot water. It dissolves easily on the addition of a little caustic soda solution. The new compound forms, on treatment with sodium nitrite and hydrochloric acid, a tetrazo compound which dissolves with difficulty.

In the above described examples two similar groups are contained in the 2- and 4-positions in the quinazoline molecule. The manufacture of these compounds from 2.4-dichloro-quinazoline was effected in a single operation throughout.

The following examples will illustrate that part of our invention, according to which the condensation of the dihalogen-benzodiazines, particularly 2.4-dihalogen-quinazolines, is carried out with two dissimilar molecules of such compounds as contain a reactive hydrogen atom attached to a nitrogen, oxygen or sulfur atom. The process is carried out in such a manner, that one molecule of a compound, containing a reactive hydrogen atom, attached to a nitrogen, oxygen or sulfur atom, is first caused to act at a low temperature upon one molecule of 2.4-dihalogenquinazoline, after which the second halogen atom of the dihalogen-quinazoline is replaced at an elevated temperature by another compound of the kinds mentioned.

Thus, a class of new and valuable mixed condensation products is also obtained, which have the most varied technical application either as such or after further decomposition, for example, as intermediate products in the manufacture of dyestuffs or also for pharmaceutical purposes.

*Example 11.*—34.1 grams of the acid sodium salt of 1-amino-8-hydroxynaphthalene-3.6-disulfonic acid (100%) and 16.5 grams of crystallized sodium acetate are dissolved in 300 cc. of hot water, allowed to cool and, when at 40° C., 19.9 grams of most finely powdered 2.4-dichloro-quinazoline are slowly introduced, while well stirring. Heating is then effected to 45–65° C., when, after some time, all the dichloro-quinazoline has disappeared. On cooling the condensation product from 1 molecule of dichloro-quinazoline and 1 molecule of 1-amino-8-hydroxynaphthalene-3.6-disulfonic acid is partially precipitated as a greenish grey magma. It is neutralized when cold with 10% sodium carbonate solution, a solution of 23.9 grams of 2-amino-5-hydroxynaphthalene-7-sulfonic acid (100%) and 14 grams of crystallized sodium acetate in 650 cc. of water is added and the whole is now quickly heated to 100° C., stirring the while. The boiling is continued under reflux until the 2-amino-5-hydroxynaphthalene-7-sulfonic acid has almost completely disappeared. The mixed condensation product from one molecule of 2.4-dichloro-quinazoline, one molecule of 1-amino-8-hydroxy-naphthalene-3.6-disulfonic acid and one molecule of 2-amino-5-hydoxynaphthalene-7-sulfonic acid is obtained on salting out as a grey powder, which is soluble in water and the alkaline solution of which does not show any fluorescence.

An isomeric compound is obtained, when the compound, obtained analogously to the first part of the above process from one molecule of 2.4-dichloro-quinazoline and one molecule of 2-amino-5-hydroxynaphthalene-7-sulfonic acid, is further condensed with one molecule of 1-amino-8-hydroxynaphthalene-3.6-disulfonic acid at 95 to 100° C.

In the intermediate products from one molecule of 2.4-dichloro-quinazoline and one molecule of any desired amino-hydroxynaphthalene-sulfonic acid still containing one mobile chlorine atom, the halogen atom can be replaced in an exactly similar manner by the residues of any desired hydrazine, for example phenylhydrazine, or other amines, such as for example methylamine, benzylamine, cyclohexylamine, aniline, its homologues and substitution products, such as 3-nitraniline, the N-alkyl-anilines, α- and β-naphthylamines and their substitution products, the 2.5-diamino-diaryl-sulfones, such as:

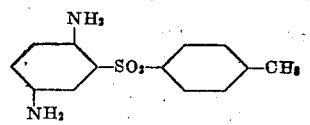

in which only the amino-group in the 5-position reacts, the aminophenols, particularly the ortho-compounds, the mono-acylated phenylenediamines, the sulfonic acids and carboxylic acids of the aromatic amines, such as the aniline-3-sulfonic acid or carboxylic acid, or the 1.3-phenylene-diamine-4-sulfonic acid, the aminosalicylic acids, the aminoarylpyrazolones, the amino-benzoyl-aminonaphthol sulfonic acids or also the amino-azo-compounds or the ω-amino-alkylamino-naphthalenes and the like. If desired the aminogroup itself can be introduced in the place of the second halogen atom. This is then carried out advantageously by heating in a closed vessel at 105° to 110° C. with an excess of aqueous ammonia. For example, the product of condensation from one molecule of 2.4-dichloroquinazoline, one molecule of 1-amino-8-hydroxynaphthalene-3.6-disulfonic acid and one molecule of ammonia having probably the following formula:

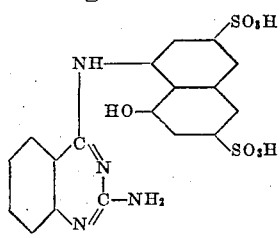

forms a grey powder, easily soluble in water with a faintly yellow coloration and which can be salted out therefrom. The alkaline solutions do not fluoresce.

*Example 12.*—19.9 grams of 2.4-dichloroquinazoline are finely powdered and dissolved in a little benzene by gently heating. This solution is run into a stirred solution of 34.1 grams of the acid sodium salt of 1-amino-benzene-8-hydroxynaphthalene-3.6-disulfonic acid in 300 cc. of hot water, to which has been added 16.5 grams of crystallized sodium acetate. The benzene-water suspension is well stirred at about 55° C. until aminonaphthol sulfonic acid can no longer be detected. The condensation product from one molecule of dichloro-quinazoline and one molecule of 1-amino-8-hydroxynaphthalene-3.6-disulfonic acid partly separates on cooling as a greenish grey, slimy precipitate, which is identical with the product described in the first part of Example 11.

The intermediate product which contains one reactive chloro-atom is salted out, filtered off and then the paste, thus obtained, is added in small portions to a melt of 20 grams of phenol and 7,0 grams of crystallized sodium acetate at a temperature of about 50° C. while stirring. When all the paste has been introduced, the melt is heated to 100° C. for some time. The condensation product thus obtained from one molecule of 2.4-dichloroquinazoline, 1 molecule of 1-amino-8-hydroxynaphthalene-3.6-disulfonic acid and one molecule of phenol, after working up in the customary manner, is a faintly yellowish colored powder; which is moderately soluble in cold water. The new compound couples with diazo-bodies and its alkaline solutions do not fluoresce.

By causing the compound from one molecule of 2.4-dichloro-quinazoline and one molecule of 1-amino-8-hydroxynaphthalene-3.6-disulfonic acid (in the place of which one can obviously also employ the analogous compounds from one molecule of 2.4-dichloroquinazoline and one molecule of any other aminonaphthol-sulfonic acid or naphthylene-diamine sulfonic acid, as for example 1.8-naphthylene-diamine-4-sulfonic acid) to react under similar conditions with a homologue or substitution product of phenol, such as with 4-nitro-1-hydroxybenzene or also with naphthols, phenol- and naphthol-sulfonic acids or carboxylic acids, or also with the equivalent quantities of thiophenols or sulfinic acid salts, mixed products of condensation are respectively obtained, the constitution of which corresponds to their manufacture from one molecule of 2.4-dichloro-quinazoline, one molecule of an amino-naphthol-sulfonic acid and one molecule of any of the compounds, just above indicated. For example, the condensation product from one molecule of 2.4-dichloroquinazoline, in which the first halogen atom has entered into reaction with 1-amino-8-hydroxynaphthalene-4.6-disulfonic acid and the second halogen atom with the sodium salt of toluene-para-sulfinic acid, thereby introducing the sulfonic group

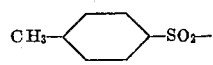

forms a grey powder, which is soluble in water with a faint yellow coloration without fluorescence and can be salted out therefrom.

Should it be desired to replace the remaining mobile chlorine atom in the condensation product from 2.4-dichloro-quinazoline and one molecule of 1-amino-8-hydroxy-naphthalene-4-sulfonic acid (which is a greyish yellow powder, soluble in water with a yellowish coloration) by the hydroxy-group, then the dilute aqueous solution of one equivalent of the said compound is treated at 100° C. with one equivalent of sodium hydroxide, the reaction proceeding in such a manner, that the progressive replacement of the halogen atom by hydroxyl groups can be plainly observed. Furthermore, when it is desired to replace the still mobile chlorine atom in the product obtained in accordance with the directions of the first part of Example 8 for the methoxy group, one mol of the said product is dissolved in warm water to a concentrated solution and a solution of one mol of potassium hydroxide in an excess of methyl alcohol is then added. The condensation is then effected in a closed vessel at 100° C. and considered complete when the alkaline reaction of the mixture has nearly disappeared. The resulting product forms an almost colorless powder, which is readily soluble in hot water and couples with diazo-compounds in a solution rendered alkaline by sodium carbonate.

Instead of using methyl alcoholic potash, when it is desired to introduce the benzyloxy group, benzyl alcohol and sodium acetate are employed and for introducing the cyclohexyloxy-group, cyclohexanol and sodium carbonate. Moreover, the second halogen atom can be satisfactorily replaced by the SH-group. For example, a neutral aqueous solution of 42.3 grams of the condensation product from one molecule of 2.4-dichloro-quinazoline and one molecule of 2-amino-5-hydroxy-naphthalene-7-sulfonic acid (sodium salt) is heated to 85° C., while stirring with 46.05 grams of a 20% aqueous sodium hydrosulfide solution until nearly all the hydrosulfide has been consumed. The product, after being worked up in the customary manner and once redissolving, is soluble in water with a yellow coloration and, the alkaline solutions show no fluorescene. When instead of sodium hydrosulfide one molecule of dithioglycol $HS.CH_2.CH_2.SH$ is employed, which is caused to act at 80° C. on the aqueous solution of two molecules of the condensation product from one molecule of 2.4-dichloro-quinazoline and one molecule of 1-amino-8-hydroxynaphthalene-3.6-disulfonic acid in the presence of two molecules of sodium acetate and a little alcohol, the whole being stirred, a compound is obtained in which two molecules of the product from one molecule of 2.4-dichloroquinazoline and one molecule of H-acid, which still contains reactive halogen, are linked together by the bridge group $—S.CH_2.CH_2.S—$. The new product forms a grey powder, which is soluble in water with a yellowish coloration and can be salted out in the form of a jelly, and one molecule of which reacts with two molecules of diazo-compounds. A similar linking-up can also be effected with poly-phenols, such as resorcinol or 2.7-dihydroxynaphthalene.

*Example 13.*—39.7 grams of 2.4-dichloro-quinazoline are condensed at 30–40° C. in benzene solution with 10.8 grams of 1.4-phenylenediamine in the presence of 16.4 grams of anhydrous finely powdered sodium acetate. The symmetrical condensation product from two molecules of 2.4-dichloro-quinazoline and one molecule of 1.4-phenylenediamine is thus obtained as a grey powder which is insoluble in water and which does not react with nitrous acid.

43.3 grams of the resulting compound are sieved. The fine powder, which is preferably formed to a paste by addition of some dioxane, is slowly introduced at 60° C. into a well stirred solution weakly acid to litmus solution, prepared from 68.2 grams of the acid sodium salt of 1-amino-8-hydroxy-naphthalene-3.6-disulfonic acid in 700 CC. of water by adding the calculated quantity of caustic soda and some dioxane. The temperature is then quickly raised to 100° C. and the whole is boiled with continual stirring until complete solution has been effected. The reaction product, the compound from two molecules of 2.4-dichloro-quinazoline, one molecule of 1.4-phenylenediamine and two molecules of 1-amino-8-hydroxynaphthalene-3.6-disulfonic acid, is a yellow-brown powder which is soluble in hot water and can be salted out from the aqueous solution. It has probably the following formula:

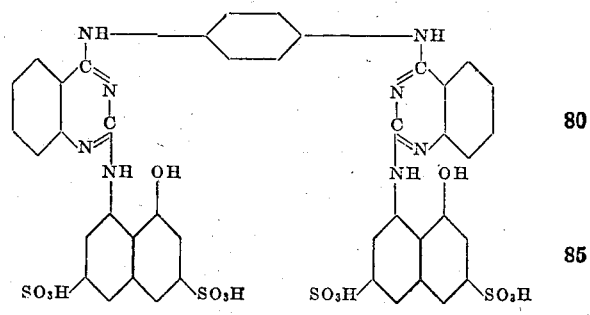

It does not react with nitrous acid, and one molecule couples with two molecules of diazo-compounds. An analogous compound is obtained by condensing the product described in the first section of this example with two molecules of 1.4-phenylenediamine-3-sulfonic acid according to the directions of this example. The replacement of the 1.4-phenylenediamine-3-sulfonic acid by the 1-3-phenylenediamine-4-sulfonic acid leads to the formation of a compound possessing similar properties.

The first chlorine atom in the 2.4-dichloro-quinazoline can be replaced in an analogous manner to that described in the first section of this example, for example, by aliphatic diamines, or also by any desired monoamines, such as aniline and its homologues, by naphthylamines unsulfonated amino-naphthols or also by phenols, their homologues and substitution products. Conversely, when it is desired to replace the first chlorine atom in the 2.4-dichloro-quinazoline by the sulfonic acids or carboxylic acids of aromatic amines, the process can also be carried out in such a manner, that an aqueous solution of one mol of the amino-sulfonic acid or carboxylic acid is heated to about 50–60° C., with the addition of sodium acetate, and a solution of one mol of 2.4-dichloro-quinazoline in acetone is dropped in with continual stirring and this temperature is maintained until the original components of the reaction can no longer be detected. The condensation product obtainable by this process from one molecule of 2.4-dichloro-quinazoline and one molecule of 1-aminobenzene-4-sulfonic acid after being salted out is, in the form of the sodium salt, a colorless powder, which does not react with nitrous acid.

The still mobile halogen atom in the primary condensation products can be replaced in accordance with the directions of section 2 of Example 13 by any other desired amine, such as for example, by 4.4′-diamino-diphenyl-3-sulfonic acid, two molecules of which interact with one molecule of the condensation product from 2 molecules of 2.4-dichloroquinazoline and 1 molecule of 1.4-phenylenediamine with the formation of a tetrazotizable compound. Likewise aminonaphthol sulfonic acids are quite generally suitable in this case. Thus, for example, the reaction proceeding at 80° C. between the condensation product from one molecule of 2.4-dichloroquinazoline and one molecule of 1-amino-benzene-4-sulfonic acid with one molecule of 1-amino-8-hydroxynaphthalene-3.6-disulfonic acid yields a mixed condensation product which already partly separates when hot. After the customary working up, it forms a yellow colored powder, which is soluble in cold water with difficulty and crystallizes in laminæ. On the addition of alkali it passes readily into solution with a yellow coloration.

When one molecule of 2.4-dichloro-quinazoline is first condensed with one molecule of 1.3-phenylenediamino-4-sulfonic acid and the intermediate product, which is capable of being diazotized, is caused to react at 100° C. with one molecule of 2-amino-5-hydroxynaphthalene-7-sulfonic acid, when desired in the presence of pyridine, a mixed compound is obtained, which can still be coupled with one molecule of a diazo-compound, but is also capable of being further diazotized with one molecule of nitrous acid. A tetrazotizable compound is produced when the product from one molecule of 2.4-dichloro-quinazoline and one molecule of 1.3-phenylenediamine-4-sulfonic acid is treated at 95° C. in the presence of sodium acetate with one molecule of 3-amino-formanilide and then carefully saponified by the addition of caustic soda solution. It forms a grey powder, which is rather difficultly soluble in water. In a similar manner one molecule of 2.4-dichloro-quinazoline can be caused to interact, first with one molecule of 1-amino-4-acetyl-aminobenzene-3-sulfonic acid and then with one molecule of 4-amino-1-hydroxybenzene-2-carboxylic acid, or the isomer of the final product thus obtained, can be synthesized by effecting the two condensations in the reverse sequence.

Furthermore, interesting compounds are obtained, when one molecule of 2.4-dichloroquinazoline is condensed in any desired sequence with, for example, one molecule of 4-(3′-nitrobenzoyl)-1.4-phenylenediamine-3-sulfonic acid and one molecule of 6-(3′-nitrobenzoyl)-amino-2-amino-toluene-4-sulfonic acid and the resulting condensation products are reduced. Again, two molecules of 2.4-dichloro-quinazoline react smoothly, for example, with one molecule of 4-4′-diaminodiphenylamino-2-sulfonic acid or with one molecule of 4.4′-diaminostilbene-disulfonic acid and compounds of a like nature. In the intermediate products thus obtainable, containing two reactive chlorine atoms, these halogen atoms can then be replaced by appropriate amines or phenols, for example by two molecules of 1.3-phenylenediamine-4-sulfonic acid or 2.6-dichloro-1.4-phenylenediamine.

When the finely sieved condensation product, described in the first section of Example 13 and prepared from two molecules of 2.4-dichloro-quinazoline and one molecule of 1.4-phenylene-diamine, is treated under pressure at 110° C. with an excess of alcoholic ammonia, both the mobile halogen atoms in the primary product are replaced by aminogroups. Thus a product of condensation is obtained from two molecules of 2.4-dicloro-quinazoline, one molecule of 1.4-phenylenediamine and two molecules of ammonia. After purification, it forms an almost colorless crystalline powder, which is free from halogen. Any desired substituted or unsubstituted aliphatic amines or also phenols, nitro-phenols or sulfinic acids can be employed instead of ammonia, whereby compounds possessing similar characteristics are obtained.

Amino-aryl-pyrazolones, as well as compounds of the type of the aminobenzoyl-2-amino-5-hydroxy-naphthalene-7-sulfonic acids likewise react fairly well with the condensation product of section 1 of Example 13. For example, the compound which is obtained at 100° C. from one molecule of the said condensation product with two molecules of 4-aminophenyl(5′-hydroxy-7′-sulfo-)-2′-naphthylurea is a grey powder, difficultly soluble in water, which is easily precipitated from the aqueous solution by means of common salt in a jelly-like form.

*Example 14.*—19.9 grams of 2.4-dichloroquinazoline are dissolved in 130 cc. of dioxane and this solution is dropped at a temperature of 50–55° C. into a well stirred solution prepared from 21,9 grams of 4-nitro-1-aminobenzene-3-sulfonic acid in 800 cc. of water by adding the calculated quantity of soda lye. When after some time the nitroaniline-sulfonic acid has disappeared the solution which has become acid to Congo is neutralized with a diluted soda lye solution and then 50 grams of a 20% aqueous solution of dimethylamine are added. Then the temperature is raised to 80–85° C. When the solution has become cool, it is made acid to Congo and the condensation product from one molecule of 2.4-dichloroquinazoline, 1 molecule of 4-nitro-1-amino-benzene-3-sulfonic acid and 1 molecule of dimethylamine is salted out. It is a yellowish compound, difficultly soluble in water, well soluble with a clear reddish-yellow color by addition of some caustic soda. By adding hydrochloric acid to this solution it becomes colorless. The new compound of the probable formula:

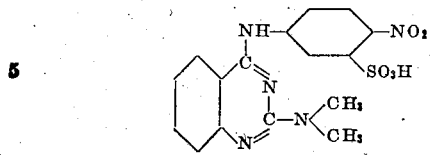

does not react with nitrous acid.

When the compound obtained from one molecule of 2.4-dichloro-quinazoline and one molecule of 4-nitro-1-aminobenzene-3-sulfonic acid is decomposed in an analogous manner with aromatic amines, such as aniline, 2-aminoanisol, 3-amino-formanilide, 2-amino-5-hydroxy-naphthalene, 2-amino-8-hydroxy-naphthalene-6-sulfonic acid or aminophenylpyrazolones in the presence of sodium acetate and perhaps a trace of copper or of a copper compound, mixed condensation products result from one molecule of dichloro-quinazoline, one molecule of 4-nitro-1-amino-benzene-3-sulfonic acid and one molecule of the respective amine.

4-nitro-1-amino-naphthalene-6-sulfonic acid can also be employed instead of the 4-nitro-1-aminobenzene-3-sulfonic acid just above described in this example. When the intermediate product thus obtained from one molecule of 2.4-dichloro-quinazoline and one molecule of 4-nitro-1-amino-naphthalene-6-sulfonic acid is decomposed, without being first isolated, with a little more than one molecule of ethyleneglycol in aqueous solution in the presence of sodium acetate at 100° C., the mixed compounds from one molecule of 2.4-dichloro-quinazoline, one molecule of 4-nitro-1-amino-naphthalene-6-sulfonic acid and one molecule of ethylene-glycol is obtained, which in the crude state is a yellowish grey colored powder, difficultly soluble in water. When it is introduced into sulfuric acid monohydrate at 0° C. and the temperature is allowed to rise slowly to 15° C., a compound easily soluble in water is obtained therefrom of the type of an ethoxy sulfuric acid ester which therefore contains the group

—O—CH$_2$.CH$_2$.O—SO$_3$H linked up with the heterocyclic ring of the quinazoline. It has probably the following formula:

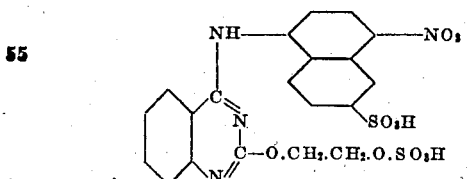

This compound is reduced smoothly by means of iron and acetic acid.

The intermediate product containing still one reactive chlorine atom above described in the first section of this example can also be condensed with other aliphatic amines, such as methylamino-ethyl-diethylamine:

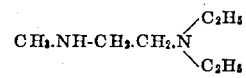

triethylenetetramine, (Jahresbericht der Chemie 1861, page 514) or also be further condensed with cyclohexyl-amine, benzylamine and 4-nitrobenzylamine. When instead of the chlorine-containing intermediate product described in section 1 of this example the intermediate product from one molecule of 2.4-dichloro-quinazoline and one molecule of phenol is employed, which is then further condensed with one molecule of 1-amino-8-hydroxynaphthalene-3.6-disulfonic acid, the isomer of the product of condensation described in section 2 of Example 12 from one molecule of 2.4-dichloro-quinazoline, one molecule of 1-amino-8-hydroxy-naphthalene 3.6-disulfonic acid and one molecule of phenol is obtained.

*Example 15.*—An aqueous solution of the condensation product from one molecule of 2.4-dichloro-quinazoline and one molecule of sulfino salicylic acid is prepared at 45° C. by the employment of 19.9 grams of 2.4-dichloro-quinazoline and 22.4 grams of the acid sodium salt of the sulfino-salicylic acid:—

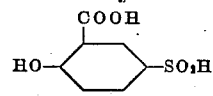

After the addition of a hot concentrated aqueous solution of 34 grams of the acid sodium salt of pure 1-amino-8-hydroxynaphthalene-4.6-disulfonic acid and 14 grams of crystallized sodium acetate, heating is effected for a prolonged time to 95° C., while stirring. When all the amino-naphthol sulfonic acid has disappeared, the further working up proceeds in the customary manner. The product thus obtained from one molecule of 2.4-dichloro-quinazoline, one molecule of sulfino-salicylic acid and one molecule of 1-amino-8-hydroxy-naphthalene-4.6-disulfonic acid is a greyish-yellow powder, which is readily soluble in caustic alkali. Its alkaline solution does not fluoresce.

Mixed condensation products can be produced in a similar manner from one molecule of 2.4-dichloro-quinazoline, one molecule of sulfino-salicylic acid and one molecule of 1-ethylamino-8-hydroxy-naphthalene-3.6-disulfonic acid or one molecule of 2-methyl-amino-5-hydroxy-naphthalene-7-sulfonic acid, 2-hexa-hydro-phenylamino-5-hydroxy-naphthalene-7-sulfonic acid or 3'-aminophenyl-5-pyrazolone-3-carboxylic acid. Compounds possessing a diazotizable amino-group are produced, when the intermediate product described in section 1 of this example is caused to react, for example with 1.3-phenylene-diamine-4-sulfonic acid or 1.4-phenylene-diamine-3-sulfonic acid.

*Example 16.*—59.4 grams of the sodium salt of 4''-amino-phenylurea-3'-aminobenzoyl-1-amino-8-hydroxy-naphthalene-4.6-disulfonic acid of the formula:

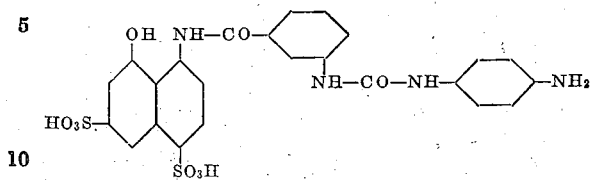

are dissolved in 600 cc. of water at 50° C. with the addition of 13.8 grams of crystallized sodium acetate. A solution of 19.9 grams of 2.4-dichloro-quinazoline in 220 cc. of acetone is dropped into the well stirred solution at about 60–70° C. As soon as the reaction is completed, the acetone is distilled off at a low temperature under reduced pressure and a concentrated aqueous solution of 25.2 grams of neutral sodium sulfite is added. Then heating takes place to 95–100° C. until all the sodium sulfite has been consumed. On salting out in the presence of hydrochloric acid, a reaction product is obtained of the first formed compound from one molecule of 2.4-dichloro-quinazoline and one molecule of 4''-aminophenylurea-3'-aminobenzoyl-1-amino-8-hydroxy-naphthalene-4.6-disulfonic acid with one molecule of sodium sulfite, that is to say, a compound which contains a $SO_3H$-group in place of the chlorine atom still present in the intermediate compound. The new compound is a greyish-white jelly-like precipitate which after drying forms a brownish powder, difficultly soluble in cold water and readily soluble in hot water by addition of some soda.

*Example 17.*—One molecule of 2.4-dichloro-quinazoline is first condensed with one molecule of acetyl-1.4-naphthylenediamine-6-sulfonic acid, according to the directions of Example 12, the acetone is completely removed and dilution is effected with a little water, after which condensation takes place with an excess of ammonia by heating to 110° C. under pressure. Thus the second halogen atom of the dichloro-quinazoline is replaced by an $NH_2$-group and at the same time the acetyl group in the acetyl-naphthylene-diamine-sulfonic acid is split out. Accordingly a diazotizable compound is obtained from one molecule of dichloro-quinazoline, one molecule of 1.4-naphthylenediamino-6-sulfonic acid and one molecule of ammonia. It forms a grey powder, which is readily soluble in hot water from which it can be salted out.

*Example 18.*—A solution of 19.9 grams of 2.4-dichloroquinazoline in 160 cc. of acetone are dropped into a well stirred solution of 34,1 grams of 1-amino-8-hydroxynaphthalene-3.6-disulfonic acid (acid sodium salt) in 600 cc. of water at a temperature of 45–50° C., the solution being weakly acid to Congo. When after some time the intermediate product, described in Example 11, which contains still one reactive chlorine-atom from one molecule dichloroquinazoline and one molecule of 1-amino-8-hydroxy-naphthalene-3-6-disulfonic acid has formed, the yellow solution is neutralized with 10% soda lye. In the meantime 27,8 grams of the sodium salt of 4-amino-4'-hydroxy-azo-benzene-3'-carboxylic acid are dissolved in 700 cc. of water. Into this solution the neutral solution of the above described intermediate product is dropped at a temperature of 70–90° C. while stirring. At this temperature the solution is kept for some time and, when a test shows that the amino-azo-compound has completely or nearly disappeared, the solution is diluted with some water and the condensation product is salted out. The condensation product from 1 molecule of dichloro-quinazoline, one molecule of 1-amino-8-hydroxy-naphthalene-3.6-disulfonic acid and one molecule of 4-amino-4'-hydroxy-azo-benzene-3'-carboxylic acid is a yellow-brown light powder which has a limited solubility in water, but is readily soluble by addition of some soda with a strongly reddish-yellow color. The new compound does not react with nitrous acid.

Instead of 1-amino-8-hydroxy-naphthalene-3.6-disulfonic acid any desired amino-hydroxy-naphthalene-sulfonic acid or amino-aryl-pyrazolones can be used. Instead of the 4-amino-4'-hydroxy-azo-benzene-3'-carboxylic acid other amino-azo-compounds e. g. the 4-amino-3-methoxy-azo-benzene-3'-carboxylic acid, amino-aryl-azo-pyrazolones, amino-aryl-azo-acetoacet-arylides can be used.

The foregoing examples offer but a selection of the great number of new compounds which are obtainable in accordance with our process. For example further mixed condensation products can also be produced from one molecule of dihalogen-quinazoline, one molecule of an unsulfonated aromatic amine, such as aniline, naphthyl-amine or the like and one molecule of another unsulfonated aromatic amine, such as halogen- or nitro-aniline. In such cases the process is advantageously carried out in organic solvents, such as benzene, toluene and the like. Likewise, condensation products can be produced from one molecule of 2.4-dihalogen-quinazoline and two molecules of two dissimilar amino-anthraquinones or from one molecule of 2.4-dihalogen-quinazoline, one molecule of an aminoanthraquinone and one molecule of another compound, containing reactive hydrogen atoms attached to a nitrogen, oxygen or sulfur atom.

Other 2.4-dihalogen-quinazolines, such as 2.4-dibromo-quinazoline, can be employed instead of 2.4-dichloro-quinazoline. Instead of sodium acetate other agents, which neutralize acids can be used, such as sodium carbonate, calcium carbonate, magnesium hydroxide, zinc carbonate and the like. Furthermore the conditions under which the replacement of the two halogen atoms is carried out can vary within certain limits.

We claim:

1. As new products the compounds of the general formula:

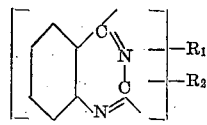

wherein $R_1$ represents any substituent which is attached to the benzo-diazine residue with a nitrogen, sulfur or oxygen atom and $R_2$ represents a substituted amino group, a substituted mercapto group or a substituted hydroxy group with the exception of an alkoxy group, being generally grayish powders soluble in water with a generally yellowish coloration, if they contain an acid group, and insoluble in water, if they are free from an acid group, and being valuable intermediate products in the manufacture of dyestuffs and pharmaceutical substances.

2. As new products the compounds of the general formula:

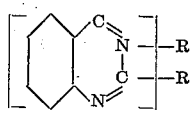

wherein R represents substituted amino groups, being generally grayish powders, soluble in water with a generally yellowish coloration, if they contain an acid group, and insoluble in water, if they are free from an acid group, and being valuable intermediate products in the manufacture of dyestuffs and pharmaceutical substances.

3. As a new product the compound of the formula:

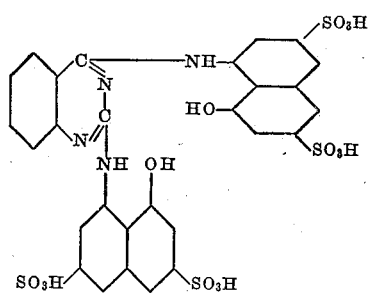

forming a grey powder easily soluble in water with a faint yellowish coloration, in aqueous solution exhibiting no fluorescence, no longer reacting with nitrous acid and coupling with two molecules of diazo-compounds.

In testimony whereof we have hereunto set our hands.

WINFRID HENTRICH.
MAX HARDTMANN.